Patented July 26, 1927.

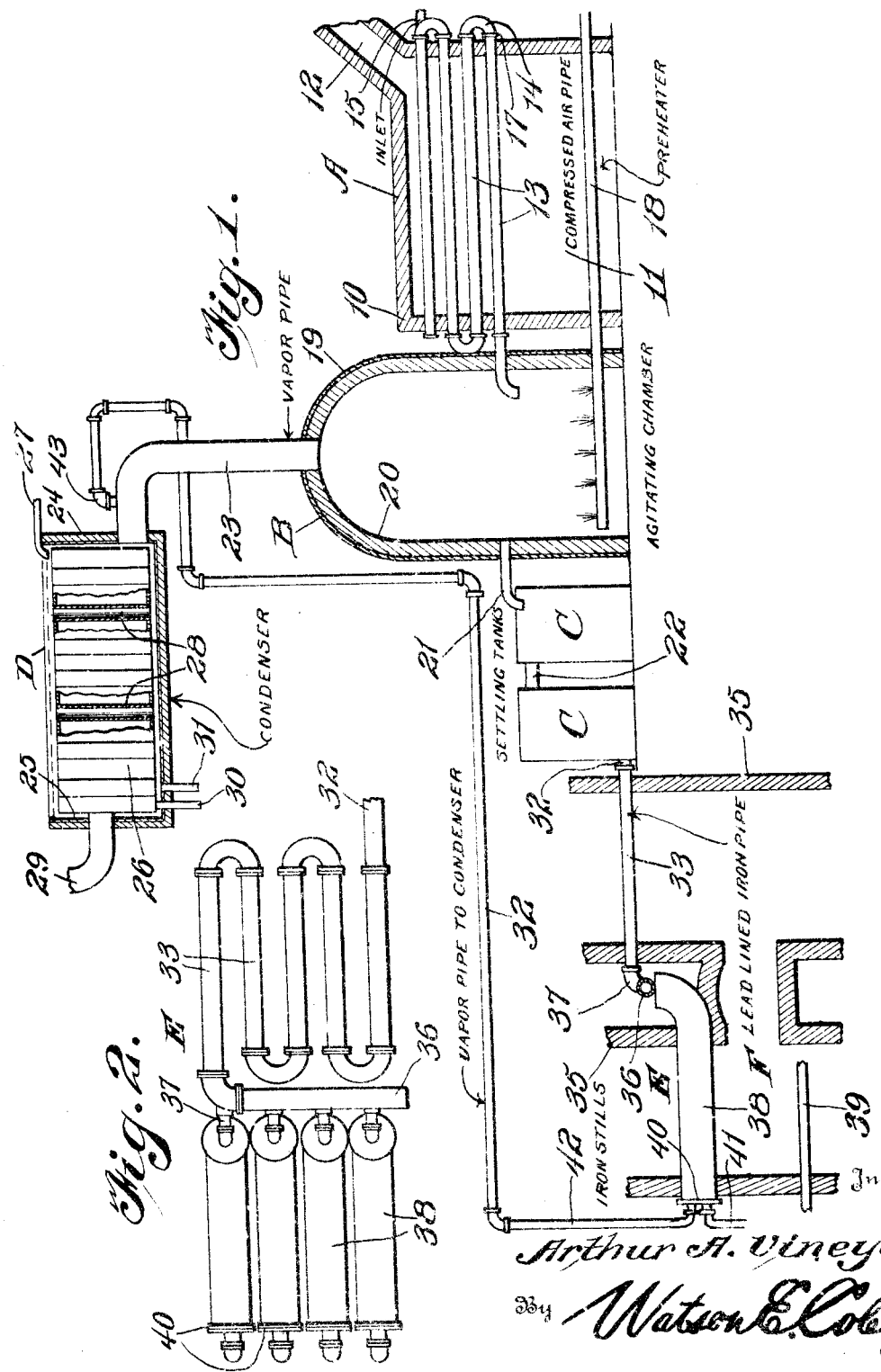

1,636,724

UNITED STATES PATENT OFFICE.

ARTHUR A. VINEYARD, OF WOOD RIVER, ILLINOIS.

METHOD OF CONCENTRATING SLUDGE ACIDS.

Original application filed September 9, 1925, Serial No. 55,324. Divided and this application filed November 27, 1925. Serial No. 71,703.

This invention relates to methods for concentrating, and particularly to a method for concentrating, treating and mixing liquids which are to be concentrated, recovered or restored to a stronger or heavier gravity, the method being particularly applicable for use in concentrating acid which has been used for oil refining, sludge acid or other weak acid, this present application being a division of application Serial #55,324, filed September 9, 1925, on systems of concentrating sulphuric acid.

The general object of this invention is to provide an acid concentrating method which includes the submission of a weak acid to the action of heat, the agitating of the heated weak acid in an agitating and vapor-releasing chamber, the settling of the liquid, the condensation of the vapor and gases which are released in the agitating chamber, and the further concentration of the liquid acid in the settling tanks.

My invention is illustrated in the accompanying drawing, wherein:—

Figure 1 is a diagrammatic view in section of the several elements of a concentrating system operating in accordance with my method;

Figure 2 is a fragmentary top plan view of the pipes 33 and concentrator or still.

Referring to this figure, A designates a heater whereby the weak acid is first submitted to the heat, B an agitating and vapor-releasing chamber, C a plurality of settling tanks into which the liquid from the chamber B passes, D the condenser into which the vapor from the chamber B passes and by which the vapor is condensed, E the strong acid concentrator, and F the heater for heating the acid passing from the settling tanks into the strong acid concentrator.

Generally speaking, the heater A comprises a fire brick heating chamber 10 having a fire box 11 at its lower end and having a flue outlet 12. Extending through this chamber are a plurality of pipes 13. These are lined with acid-resisting metal and have the returned bends 14 so that the acid will flow continuously from the discharge inlet 15 to the discharge outlet 16. The chamber 10 may be heated by means of oil or other suitable heating means beneath the series of pipes. The flanges 17, it will be noted, are outside of the furnace wall. This prevents melting of the flanges. Passing through the furnace below the series of pipes 17 is a compressed air pipe 18 which discharges into the agitating chamber B.

The outlet 16 leads from the series of pipes 13 into the chamber B which is constructed of an outside shell of lead 19 lined with acid-proof brick and cement 20. The air pipe 18, which is made of acid-resisting material, has a number of air jets within the chamber whereby the heated compressed air may be discharged upward through the liquid which partially fills the chamber. The discharge of the air upward through the chamber acts to thoroughly agitate the liquid, breaks up organic matter, and helps to release the gases from the acid. The breaking up of the organic matter tends to prevent any retardation of flow from the chamber to the settling tank.

Extending from the chamber B is a pipe 21 which discharges into the first settling tank C and from a point adjacent the top of this settling tank leads a pipe 22 to the next settling tank, and so on. The organic matter is removed by skimming from the top or after the acid has been drawn off through the bottom. The settling tank may be washed and the organic matter carried off into a sewer by a hose. If there is no organic matter in large quantities in the acid, there is no necessity of carrying the acid from the chamber B into the settling tank but it may be carried directly to the strong acid concentrator E.

Leading from the top of the agitating chamber B is a vapor outlet pipe 23 which leads into the condenser D. This may be of any suitable construction but is illustrated as consisting of an outer wooden jacket 24 lined with lead 25, and disposed within this lead tank is a shell 26 of lead. The vapor inlet pipe 23 leads through the wall of the condensing tank and into the shell 26 and discharges the vapor therein. The shell 26 is entirely surrounded by water contained within the tank and fed thereto by the water inlet pipe 27.

Passing vertically through the shell are passages 28, the walls of which are of lead and through which the water passes and circulates so that the vapor within this condensing tank is continually submitted to the cooling action of water. From the end of this shell opposite the inlet pipe 23 is an exit pipe 29, while from one end of this shell and leading downward through the bottom of the water tank is an acid drip outlet 30. Leading from the bottom of the tank is a water outlet 31. The acid from the settling tank C or the acid coming directly from the chamber B, if no settling tanks are used, passes into a pipe 32 and thence into a lead lined pipe 33 which passes backward and forward by a series of convolutions through the fire-box F.

The flanges of the return bends of each end of the convoluted line of pipe 33 are disposed entirely exteriorly of the forward and rear walls 35 of this heating chamber. The pipe 33, after it passes through the heating chamber, extends through the forward wall thereof and then extends laterally in the form of a header 36 and from this header extends a plurality of discharge pipes 37, these extending forwardly and downwardly and discharging into the upturned ends of a plurality of relatively large pipes 38. These pipes 38 are of cast iron, Duriron or other acid-resisting metal. These are disposed within the chamber E and there submitted to the action of heat from an oil burner 39 or other heating means. The forward end of each pipe 38 is provided with a head 40 and from this head extends an outlet pipe 41 leading to a storage tank, and from the upper portion of this head leads an outlet pipe 42 which extends back to the condenser D and enters the vapor inlet pipe leading to this condenser at 43. Thus any vapor rising from the liquid in the cast iron pipes 38 will be carried back and re-condensed. The strong acid concentrator is designed to raise the acid to 66°, and it is to be noted that the heat from the large still pipe furnace E is used in the fire-box F for the purpose of heating the pipes 33.

The value of this concentrating system resides particularly in the fact that the cost of concentration is reduced at least one-half. Furthermore, the system eliminates the very offensive gas which is destructive to property both in the plants and outside the plants, which gas is produced where the open system of concentration is in use. Another advantage resides in the small loss from concentrating. Thus gases which usually escape in ordinary systems are condensed and concentrated in this system. Furthermore, the cost of upkeep and labor is relatively small and this, of course, acts to reduce the cost of concentration. This method of concentrating and the apparatus which is shown in detail in my co-pending application before referred to may be used with success in concentrating, treating and mixing many different liquids. In fact, any liquid to be concentrated, recovered or restored to a stronger or heavier gravity might be treated by this process with success. Carbonic acid and gas liquor could be treated or concentrated more successfully than any other liquid except sulphuric acid. This method is especially designed to concentrate any acids or liquids that give off a noxious gas because this system combines and condenses said gas. Should there be a small percentage of non-condensable gas in any liquids concentrated, it could be taken care of after passing from the exit pipe by being drowned in a spray of water connected to a sewer.

The step in my method which consists in conducting the hot liquid into a gas releasing chamber where the liquid is agitated by the injection of hot air is a very important one for, as soon as the hot liquid enters the releasing chamber or agitating chamber there is a portion of vapor or gas immediately released. The liquid is then subjected to an agitating process by the compressed heated air which further aids to release more vapor and gas and to break up organic matter. The hot air prevents the absorption of moisture by the acid which would lower the specific gravity. The agitation of the liquid in the chamber to break up organic matter is of great value in treating sludge acid which is obtained in refining oil. The carbon or organic matter in the sludge acid has a tendency to block up a tower or tank unless the liquid has been previously agitated. In the settling tanks this organic matter settles to the bottoms of the tanks and the acid which is drawn off from the settling tanks is then reasonably free from organic matter.

While I have illustrated the specific apparatus which I have particularly designed to carry out my method, I do not wish to be limited to this as it is obvious that other apparatus might be used or modifications of this apparatus might be devised with which to carry out the process.

I claim:—

1. A method of concentrating sludge acid containing organic matter consisting in preheating the acid, carrying it into an agitating tank, maintaining the temperature of the acid therein and agitating the acid to break up organic matter, carrying the liquid to a settling tank to thereby separate the organic matter from the acid, conducting the acid free from organic matter to a heater and while still hot concentrating the acid.

2. A method of concentrating acids containing organic impurities consisting in heating the liquid and conducting it to an agitating tank, agitating it therein by hot air under pressure, carrying off vapor from said agitating tank, carrying the liquid from the agitating tank to a settling tank and from thence to a second heater and thence into a concentrating still.

3. A method of concentrating sulphuric acid containing organic matters consisting in heating the acid and conducting it while still hot into an agitating tank, agitating it by hot compressed air, to thereby maintain the heat of the acid and release gases therefrom and break up organic matter, carrying off the vapor from said agitating tank and conducting the liquid to a settling tank to permit foreign matters to be skimmed off, and carrying the liquid from the settling tank into a second heater and from thence into a concentrating still.

In testimony whereof I hereunto affix my signature.

ARTHUR A. VINEYARD.